United States Patent
Shin et al.

(10) Patent No.: US 11,691,613 B2
(45) Date of Patent: Jul. 4, 2023

(54) METHOD FOR CONTROLLING HEATING OF HYBRID VEHICLE

(71) Applicants: Hyundai Motor Company, Seoul (KR); Kia Motors Corporation, Seoul (KR)

(72) Inventors: Dong-Jun Shin, Gyeonggi-do (KR); Hyung-Souk Kang, Seoul (KR); Jun-Yeon Park, Incheon (KR); Chun-Hyuk Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 841 days.

(21) Appl. No.: 16/593,680

(22) Filed: Oct. 4, 2019

(65) Prior Publication Data
US 2020/0108820 A1    Apr. 9, 2020

(30) Foreign Application Priority Data
Oct. 5, 2018   (KR) .................. 10-2018-0119327

(51) Int. Cl.
*B60W 10/30*     (2006.01)
*B60W 20/15*     (2016.01)
(Continued)

(52) U.S. Cl.
CPC ............ *B60W 10/30* (2013.01); *B60L 58/12* (2019.02); *B60W 20/15* (2016.01); *F01P 3/18* (2013.01);
(Continued)

(58) Field of Classification Search
CPC . B60W 10/30; B60W 2510/244; B60L 58/12; B60L 2210/10; F01P 3/18
(Continued)

(56) References Cited

U.S. PATENT DOCUMENTS 9,067,475 B1    6/2015  Jeong
2011/0005255 A1*  1/2011  Tanihata ............ B60H 1/00785
                                                    165/59
(Continued)

FOREIGN PATENT DOCUMENTS

CN        102950993    *  3/2015   ........... B60H 1/2218
CN        106166934    * 11/2016   ......... B60H 1/00878
(Continued)

OTHER PUBLICATIONS

Kr101684146 Machine translation, Kee et al. (Year: 2016).*
(Continued)

*Primary Examiner* — Charles A Fox
*Assistant Examiner* — Michael E Butler
(74) *Attorney, Agent, or Firm* — Fox Rothschild LLP (57) ABSTRACT

A method for controlling heating of a hybrid vehicle is provided. The vehicle includes a duct flowing air into the indoor of the hybrid vehicle from the outside, a heater core for circulating the coolant heated from an engine inside the duct, a PTC heater heated by the power supplied from a high-voltage battery of the hybrid vehicle inside the duct, and a controller. The controller operates the engine and the PTC heater and heats the air flowing into the indoor of the hybrid vehicle through the duct. The voltage supplied to the PTC heater from a low voltage DC-DC converter (LDC) is (Continued)

changed based on the state of the engine and an auxiliary battery for supplying power to an electric component of the vehicle to apply power to the PTC heater.

9 Claims, 10 Drawing Sheets

(51) Int. Cl.
  *F01P 3/18* (2006.01)
  *B60L 58/12* (2019.01)
  *B60L 1/06* (2006.01)
  *B60L 58/24* (2019.01)
  *B60H 1/22* (2006.01)
  *B60W 10/06* (2006.01)

(52) U.S. Cl.
  CPC ...... *B60H 1/2225* (2013.01); *B60H 2001/224* (2013.01); *B60H 2001/2253* (2013.01); *B60L 1/06* (2013.01); *B60L 58/24* (2019.02); *B60L 2210/10* (2013.01); *B60W 10/06* (2013.01); *B60W 2510/244* (2013.01); *F01P 2050/24* (2013.01); *F01P 2060/08* (2013.01)

(58) Field of Classification Search
  USPC .......................................................... 701/22
  See application file for complete search history.

(56) References Cited

U.S. PATENT DOCUMENTS

| | | | |
|---|---|---|---|
| 2014/0136087 A1 | 5/2014 | Kamatani | |
| 2015/0153367 A1 | 6/2015 | Jeong | |
| 2015/0158367 A1* | 6/2015 | Jeong | B60H 1/004 |
| | | | 701/36 |
| 2015/0217623 A1* | 8/2015 | Hatakeyama | B60L 1/02 |
| | | | 429/62 |

FOREIGN PATENT DOCUMENTS

| | | | | |
|---|---|---|---|---|
| CN | 108200668 | * | 6/2018 | ............ H02M 3/158 |
| JP | 2016132271 | * | 7/2016 | ............... B60H 1/22 |
| KR | 10-2015-0065409 A | | 6/2015 | |
| KR | 10-1684146 B1 | | 12/2016 | |
| KR | 101684146 B1 | | 12/2016 | |
| WO | 2012/176284 A1 | | 12/2012 | |

OTHER PUBLICATIONS

CN 106166934 A—machine Translation—Wu et al.—(Year: 2016).*
CN 108200668 A—machine translation—Hao et al. (Year: 2018).*
JP 2016132271 A—machine translation—Fujiki et al. (Year: 2018).*
CN 102950993 B—machine translation—Won et al. (Year: 2015).*

* cited by examiner

METHOD FOR CONTROLLING HEATING OF HYBRID VEHICLE

CROSS-REFERENCE TO RELATED APPLICATION

This application claims priority to Korean Patent Application No. 10-2018-0119327, filed on Oct. 5, 2018, which is incorporated herein by reference in its entirety.

BACKGROUND

Field of the Disclosure

The present disclosure relates to a method for controlling heating of a hybrid vehicle using an engine and a motor as power sources, and more particularly, to a method for controlling heating of a hybrid vehicle, which reduces an operation of an engine for securing a heat source for heating in colder climates, thereby preventing reduction of fuel efficiency.

Description of Related Art

A hybrid vehicle (HEV) uses an engine and a motor as power sources to generate power required for driving a vehicle. The hybrid vehicle may operate only any one of the engine or the motor, or operate the engine and the motor simultaneously, according to the traveling state of the vehicle. Recently, a plug-in hybrid vehicle (PHEV) having a separate charging unit to increase the distance to be traveled by a motor is also supplied increasingly.

The hybrid vehicle and the plug-in hybrid vehicle (hereinafter, referred to as 'hybrid vehicle') determine the output of the engine and whether to operate the engine based on system efficiency. In colder temperatures, when the outside air is in a low temperature and the heating is required, an operation of the engine is increased compared to the room temperature to secure a heat source for heating, such that the state of charge (SOC) of a high-voltage battery is also mainly operated for charging.

Figure 1:
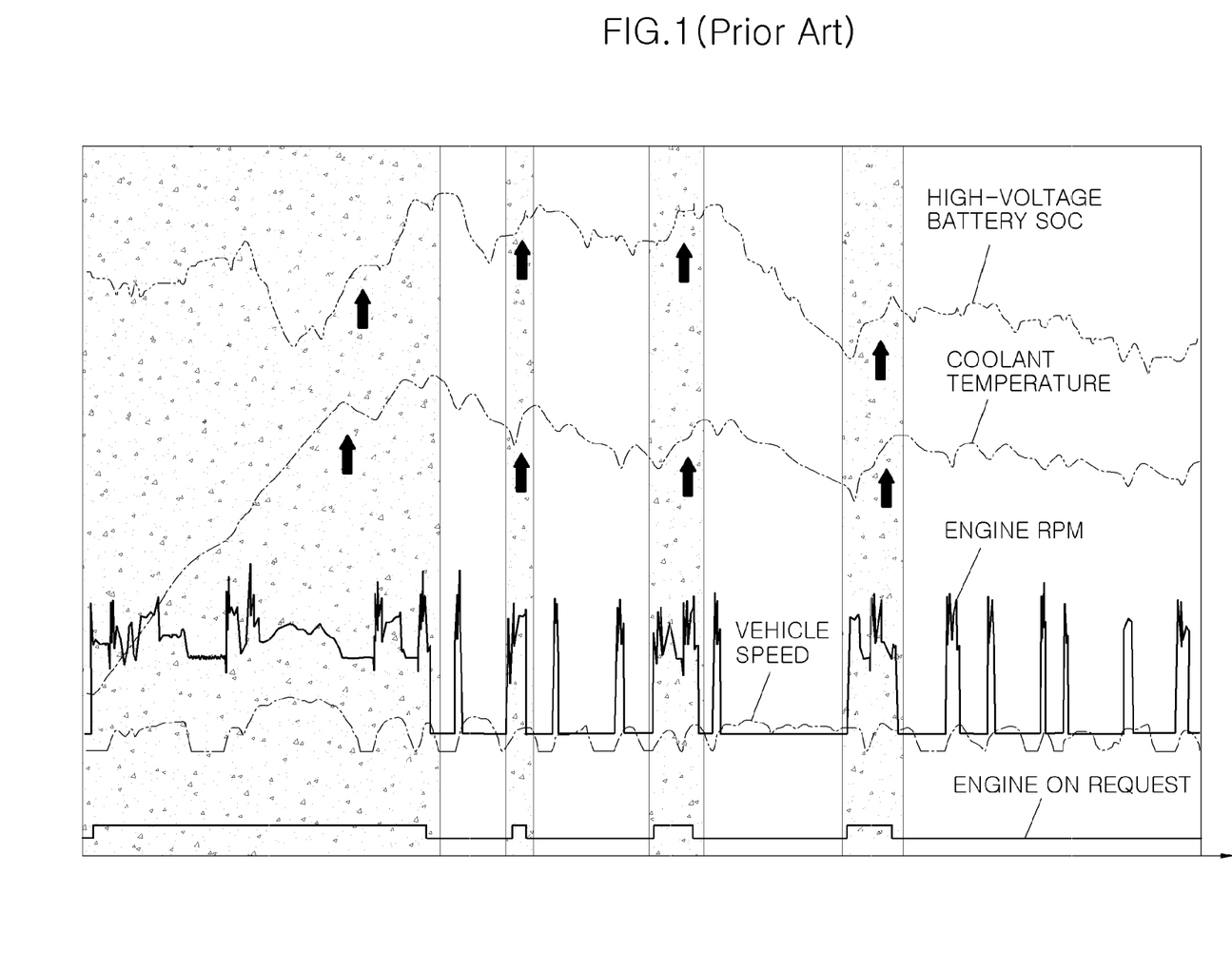
FIG. 1 is a diagram illustrating a traveling situation upon heating of a hybrid vehicle according to the prior art.

In other words, as illustrated in FIG. 1 of the prior art, when the outside air is in a low temperature, the operation of the engine is required to increase the temperature of the coolant as the temperature of the coolant decreases (shaded area). As the coolant temperature is decreased, an engine operation request (engine ON Request) is transferred from a full automatic temperature controller (FATC) to a hybrid controller (HCU), and the engine is operated for the purpose of securing the heat quantity. However, the engine is idled, or operated to generate a low torque, thereby reducing the system efficiency and charging the high-voltage battery more than necessary.

Figure 2:
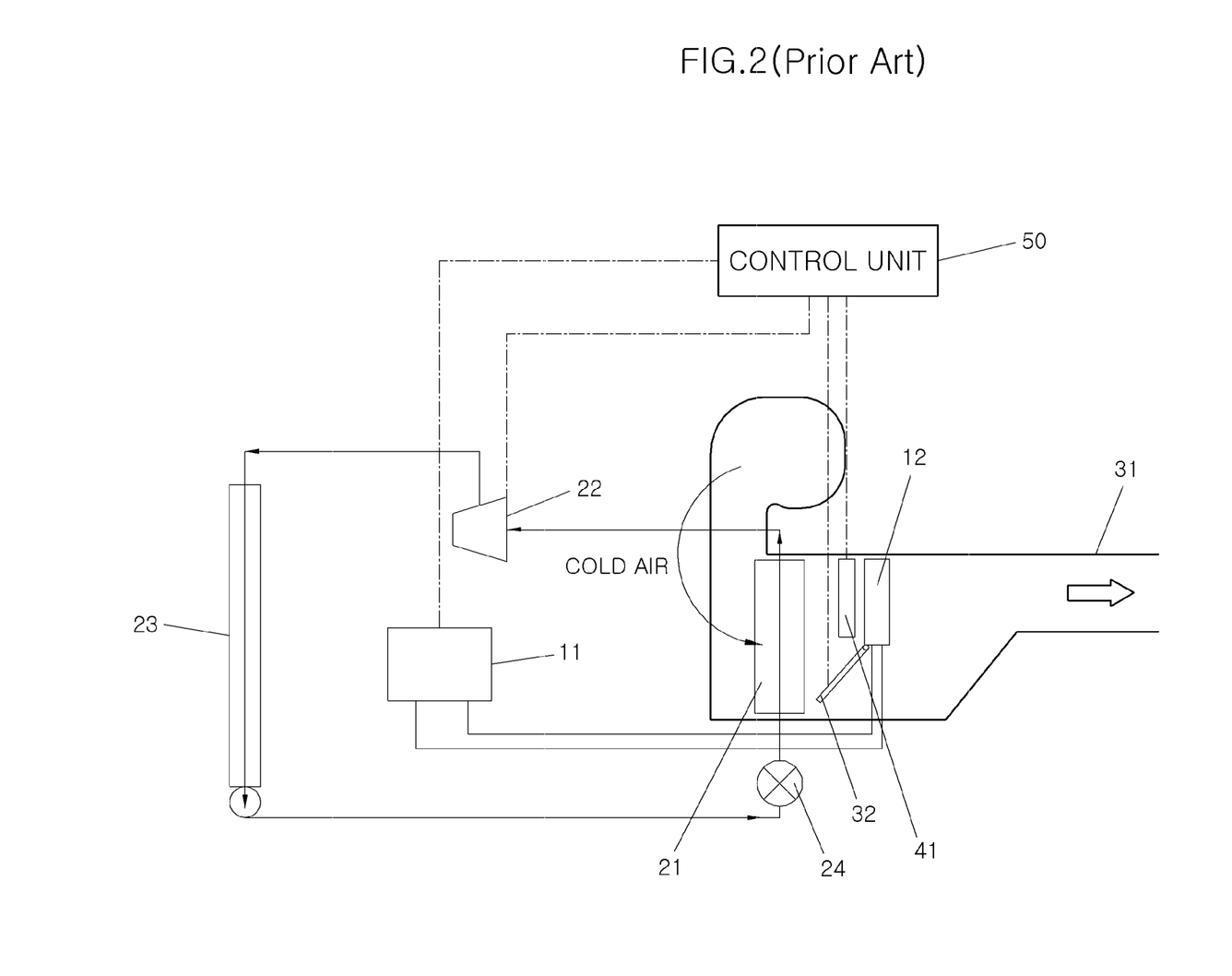
FIG. 2 is a schematic diagram illustrating an air conditioning system of the hybrid vehicle according to the prior art.

Meanwhile, the hybrid vehicle is an example that has a positive temperature coefficient (PTC) heater that is heated by a power source regardless of whether the engine is operated. As illustrated in FIG. 2 of the prior art, a heater core 12 through which the coolant heated by an engine 11 is circulated is disposed inside a duct 31 into which air flows from the outside into the indoor to heat the air flowing into the indoor of the vehicle. In addition, an evaporator 23 is provided to supply the air to the indoor in a state of exchanging heat in the evaporator 23 to be cooled, when refrigerant is cooled while circulating through a compressor 22-a condenser 21-an expansion valve 24-the evaporator 23. In addition, the duct 31 may include a PTC heater 41 configured to generate heat by a power source, and a temp door 32 configured to adjust a flow path of the air during air conditioning is installed thereto.

As described above, in the hybrid vehicle provided with the PTC heater 41, it may be possible to heat the air flowing into the indoor by the heater core 12 in which the coolant flows and the PTC heater 41 for generating heat by the power source, thereby enhancing fuel efficiency compared to the heating using only the heat source of the engine 11.

Figure 3:
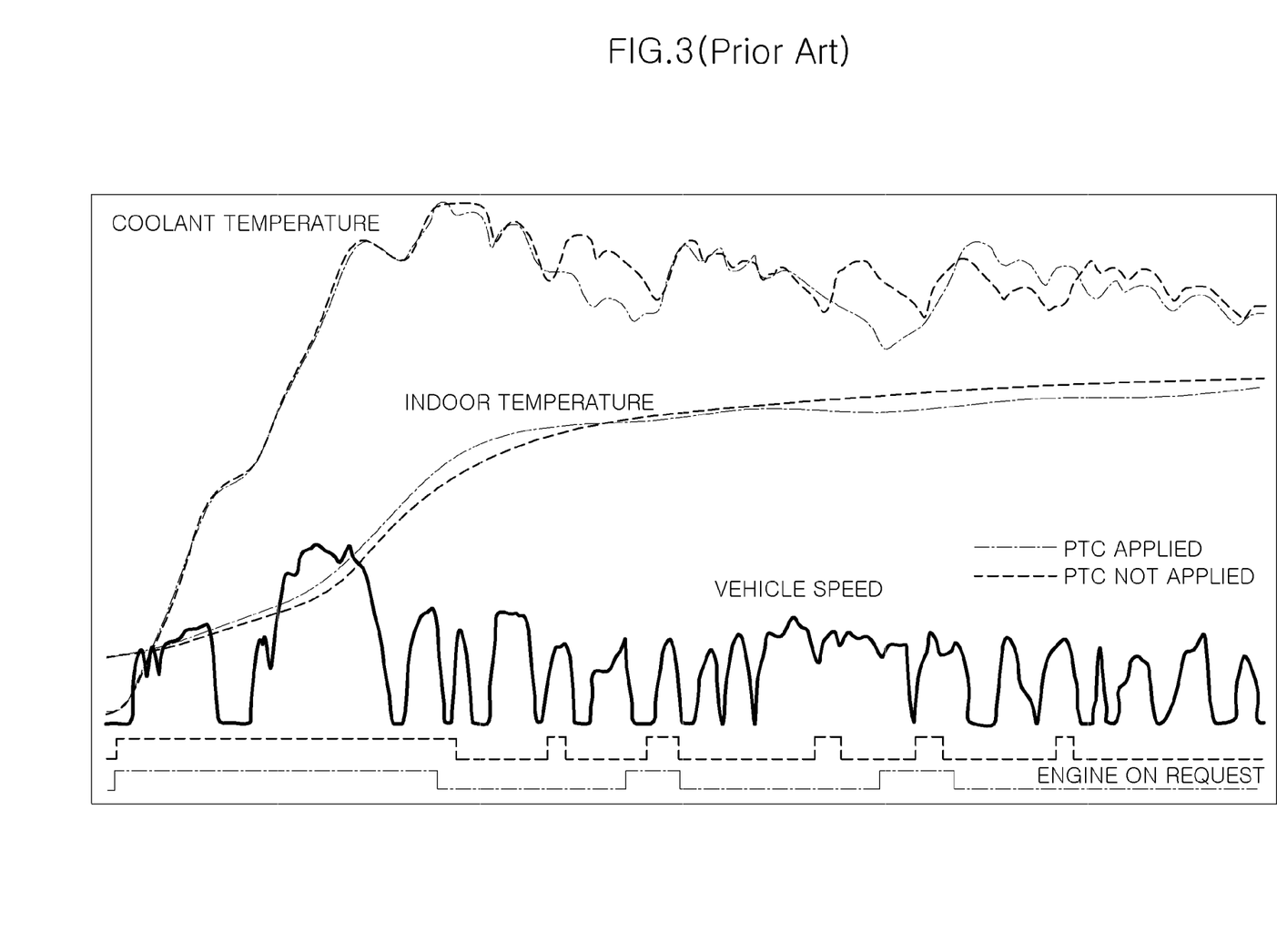
FIG. 3 is a graph illustrating the relationship between a coolant temperature and an indoor temperature and an engine operation according to the application of a PTC heater upon heating of the hybrid vehicle according to the prior art.
Figure 4:
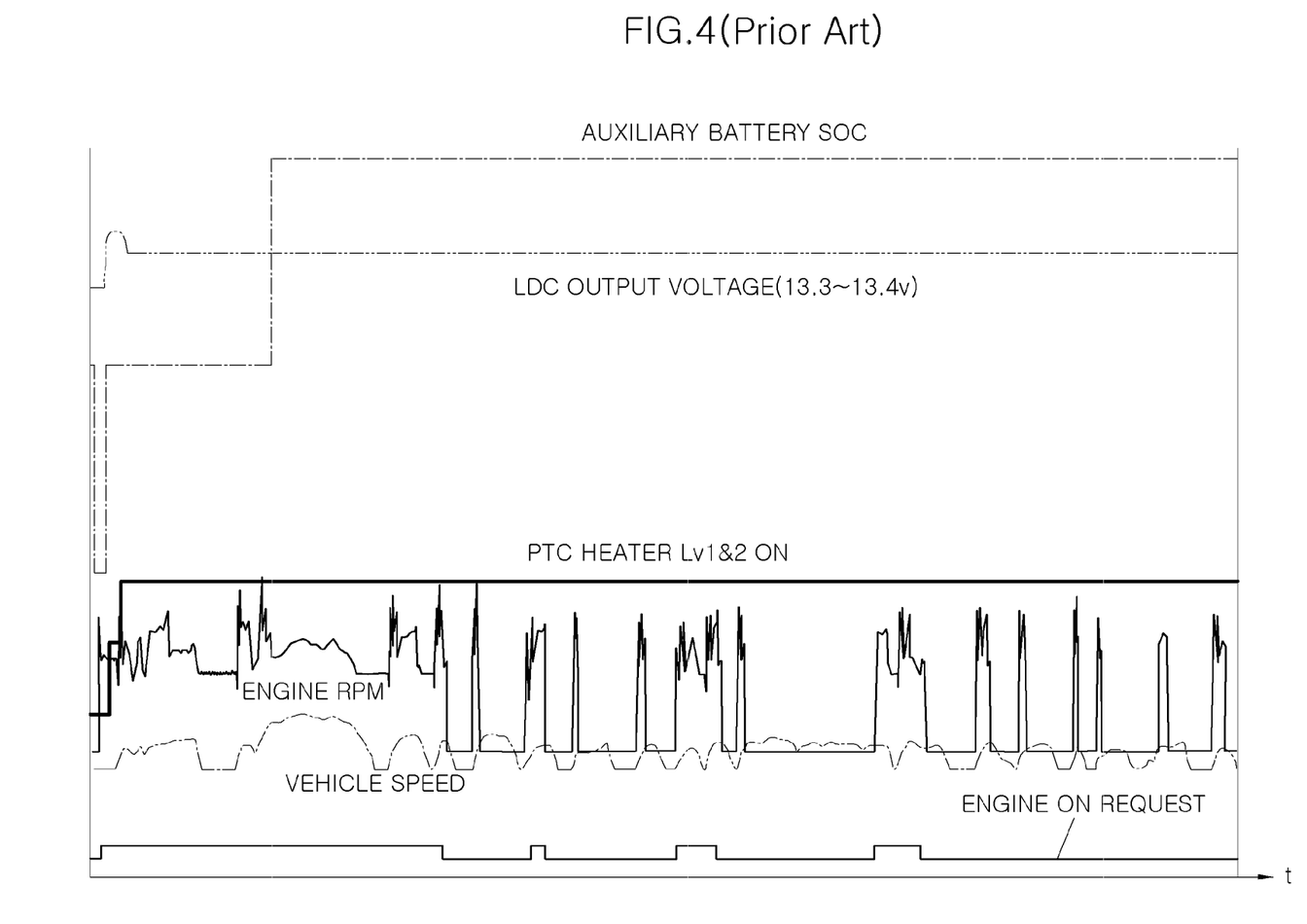
FIG. 4 is a graph illustrating a traveling situation upon heating in a state where the hybrid vehicle according to the prior art has mounted the PTC heater.
Figure 5A:
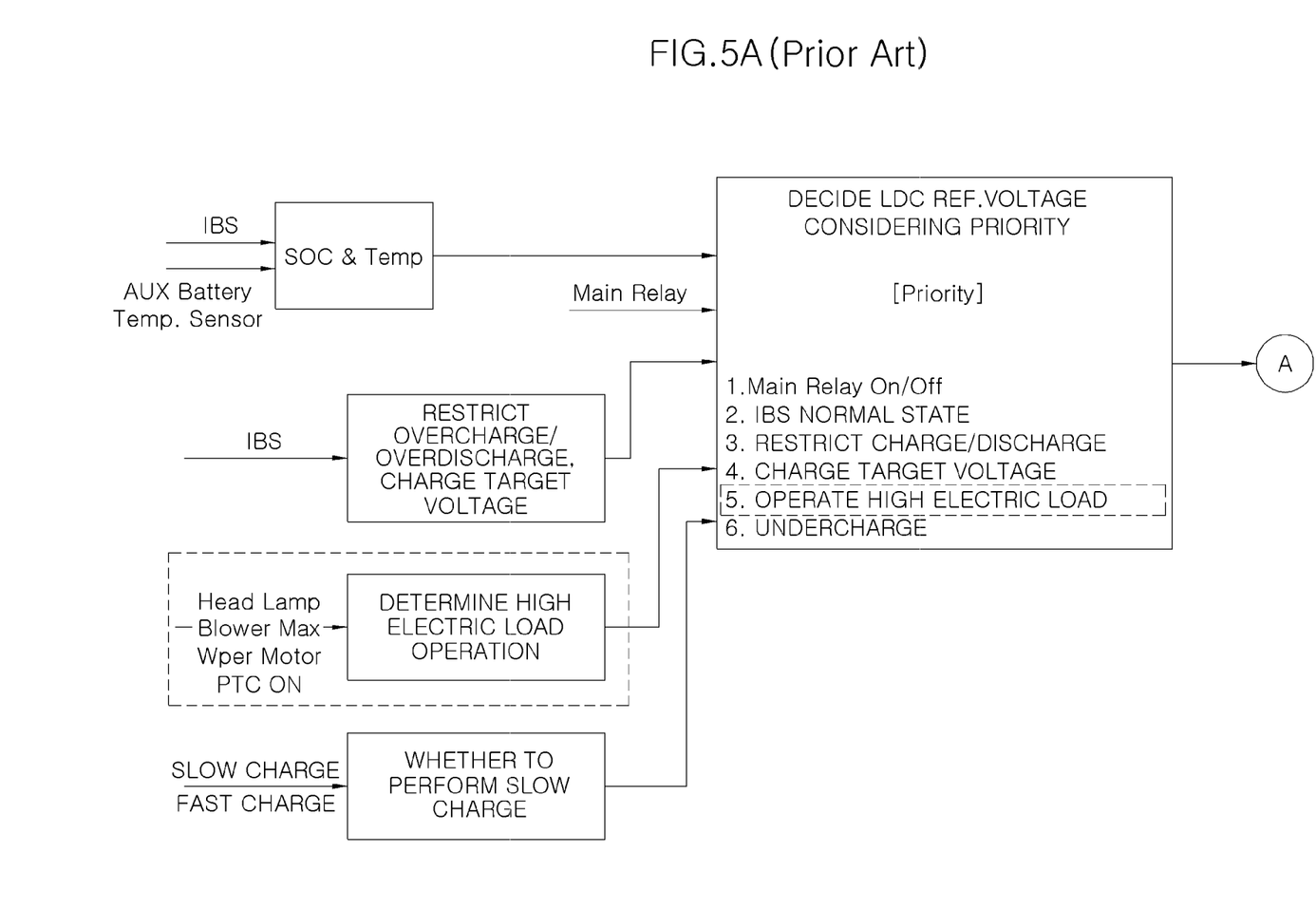
FIG. 5A and FIG. 5B are block diagrams illustrating a state of determining an output voltage of an LDC in the hybrid vehicle according to the prior art.
Figure 5B:
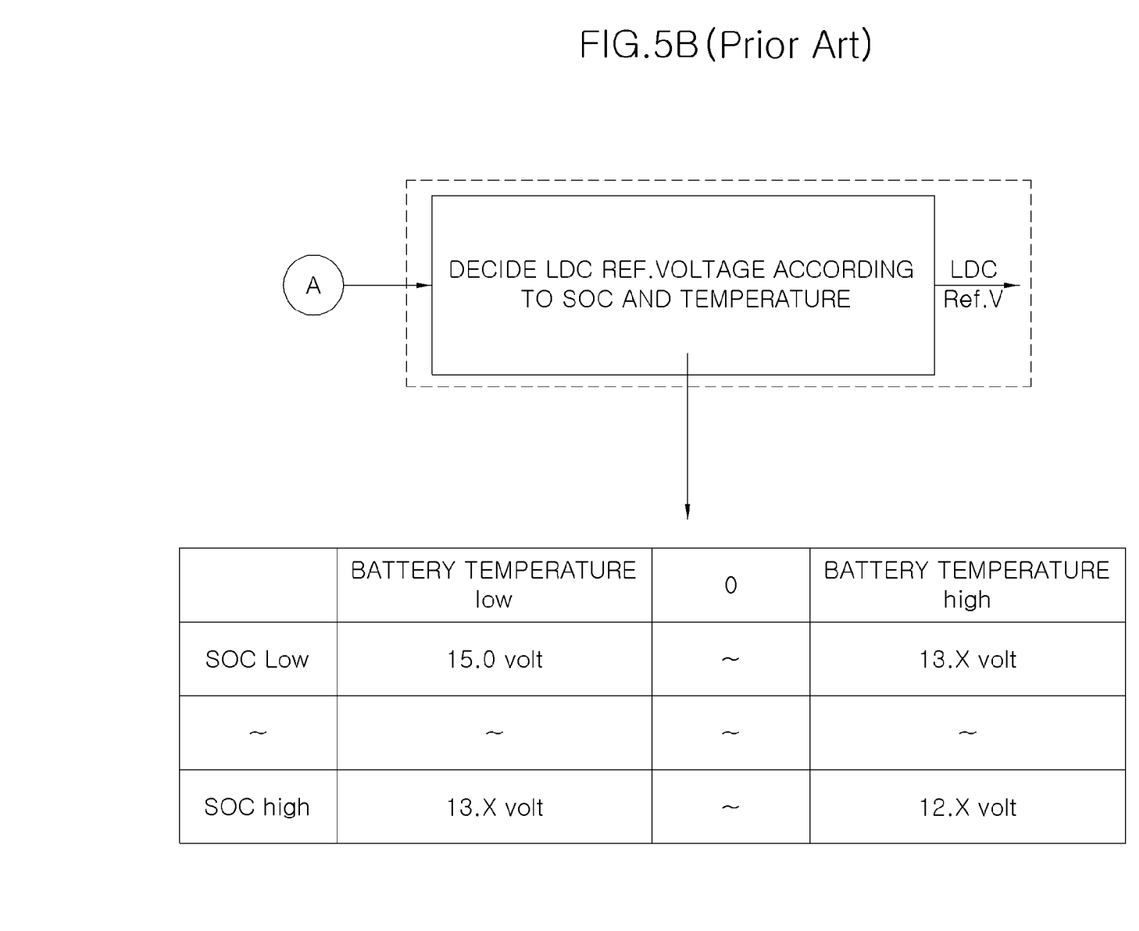

FIG. 3 is a diagram of the prior art illustrating the relationship between the coolant temperature, the indoor temperature, and the engine operation of the hybrid vehicle to which the PTC heater 41 is applied. It is possible to secure the heat source necessary for heating through the PTC heater 41 by applying the PTC heater 41 even when the temperature of the coolant is reduced, thereby reducing the number of times of operating the engine to enhance fuel efficiency.

Even when the PTC heater 41 is mounted in the hybrid vehicle, a low voltage DC-DC converter (LDC) stops a variable voltage control, and enters a high electric load mode. However, when the LDC is operated in the high electric load mode, the SOC and the temperature of the auxiliary battery are received, and a target voltage is calculated based on the above, thereby not considering the characteristic of the PTC heater 41 and the traveling state of the vehicle.

The contents described in section are to help the understanding of the background of the present disclosure, and may include what is not previously known to those skilled in the art to which the present disclosure pertains.

SUMMARY

The present disclosure provides a method for controlling heating of a hybrid vehicle, which improves a high electric load voltage control considering a PTC heater in a traveling state requiring heating in a hybrid vehicle, thereby minimizing an engine operation request for heating.

A method for controlling heating of a hybrid vehicle that includes a duct flowing air into the indoor of the hybrid vehicle from the outside, a heater core for circulating the coolant heated from an engine inside the duct, a PTC heater heated by the power supplied from a high-voltage battery of the hybrid vehicle inside the duct, and a controller configured to operate the engine and the PTC heater, and heat the air flowing into the indoor of the hybrid vehicle through the duct, the voltage supplied to the PTC heater from a low voltage DC-DC converter (LDC) is changed based on the state of the engine and an auxiliary battery for supplying power to an electric component of the vehicle to apply power to the PTC heater.

The method for controlling heating of the hybrid vehicle may include determining a high electric load target voltage that determines a target output voltage to be output from the LDC to the PTC heater according to the state of the engine and the auxiliary battery configured to supply power to the electric component of the vehicle, and applying power to the PTC heater that applies the target output voltage to the PTC heater in the LDC to heat the PTC heater to increase the temperature of the air passing through the duct.

The determining of the high electric load target voltage may include calculating a correction voltage to be corrected according to the state of the engine and the auxiliary battery with respect to a reference voltage that has been set to be applied to the PTC heater as an initial condition, calculating a target voltage by adding the correction voltage to the reference voltage, and determining a target output voltage that sets the target voltage as a target output voltage applied to the PTC heater.

In the calculating of the correction voltage, the output of the engine and the correction voltage are directly proportional to each other. In addition, the correction voltage may be set to positive when the output of the engine is greater than a predetermined ratio with respect to the maximum output of the engine, and the correction may be is set to negative when the output of the engine is less than the predetermined ratio.

In addition, in the calculating of the correction voltage, the temperature of the auxiliary battery and the correction voltage are directly proportional to each other. The correction voltage may be set to positive when the temperature of the auxiliary battery is greater than a predetermined temperature, and the correction voltage may be set to negative when the temperature of the auxiliary battery is less than the predetermined temperature.

Further, in the calculating of the correction voltage, the state of charge (SOC) of the auxiliary battery and the correction voltage are directly proportional to each other. The correction voltage may be set to positive when the SOC of the auxiliary battery is greater than a predetermined SOC, and the correction voltage may be set to negative when the SOC of the auxiliary battery is less than the predetermined SOC. The correction voltage may be added to the reference voltage by summing the correction voltage set by the output of the engine, the correction voltage set by the temperature of the auxiliary battery, and the correction voltage set by the SOC of the auxiliary battery.

The method for controlling heating of the hybrid vehicle may further include, between calculating the target voltage and determining the target output voltage, setting a voltage range that confirms whether the calculated target voltage is between the maximum voltage and the minimum voltage capable of being output from the LDC to the PTC heater, setting the maximum voltage as the target output voltage when the calculated target voltage is greater than the maximum voltage, and setting the minimum voltage as the target output voltage when the calculated target voltage is less than the minimum voltage.

The method may also include determining LDC controllability that determines whether the LDC for converting the power of a high-voltage battery into a state that may be supplied to the PTC heater normally operates by the controller, before determining the high electric load target voltage. The method may further include, between determining the LDC controllability and determining the high electric load target voltage, determining PTC heater operation request that determines whether to operate the PTC heater by not heating the air supplied to the indoor according to the temperature that has been set from a passenger using only the coolant circulating into the heater core by the controller.

Additionally, the method may include, between determining the LDC controllability and determining the high electric load target voltage, determining high electric load mode entry that determines whether the LDC may enter a high electric load mode by the controller. After the applying the power to the PTC heater, the method may include determining start-off that determines whether the hybrid vehicle has been started-off, and in response to determining that the hybrid vehicle has not been started-off, the process may return to determining the LDC controllability.

In response to determining that the LDC does not normally operate by the controller, the determining of the start-off may be performed. In the determining of the PTC heater operation request, in response to determining by the controller to increase the temperature of the air flowing through the duct so that a passenger reaches a predetermined temperature only with the heat of the heater core, the determining the start-off may be performed. In the determining of the high electric load mode entry, in response to determining by the controller not to enter the LDC into a high electric load mode, the determining the start-off may be performed.

According to the method for controlling heating of the hybrid vehicle of the present disclosure having the above configuration, it may be unnecessary to often operate the engine for securing the heat source for heating when the temperature of the outside air is low in the hybrid vehicle (including the plug-in hybrid vehicle). As a result, it may be possible to reduce the number of times that the engine is operated for heating, thereby enhancing fuel efficiency. In addition, the operation of the engine may be reduced, but the indoor heating may be received to meet the passenger's request, such that it may be possible to maintain a desired indoor temperature of the vehicle.

BRIEF DESCRIPTION OF THE DRAWINGS

A brief description of each drawing is provided to more sufficiently understand drawings used in the detailed description of the present invention.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 6:
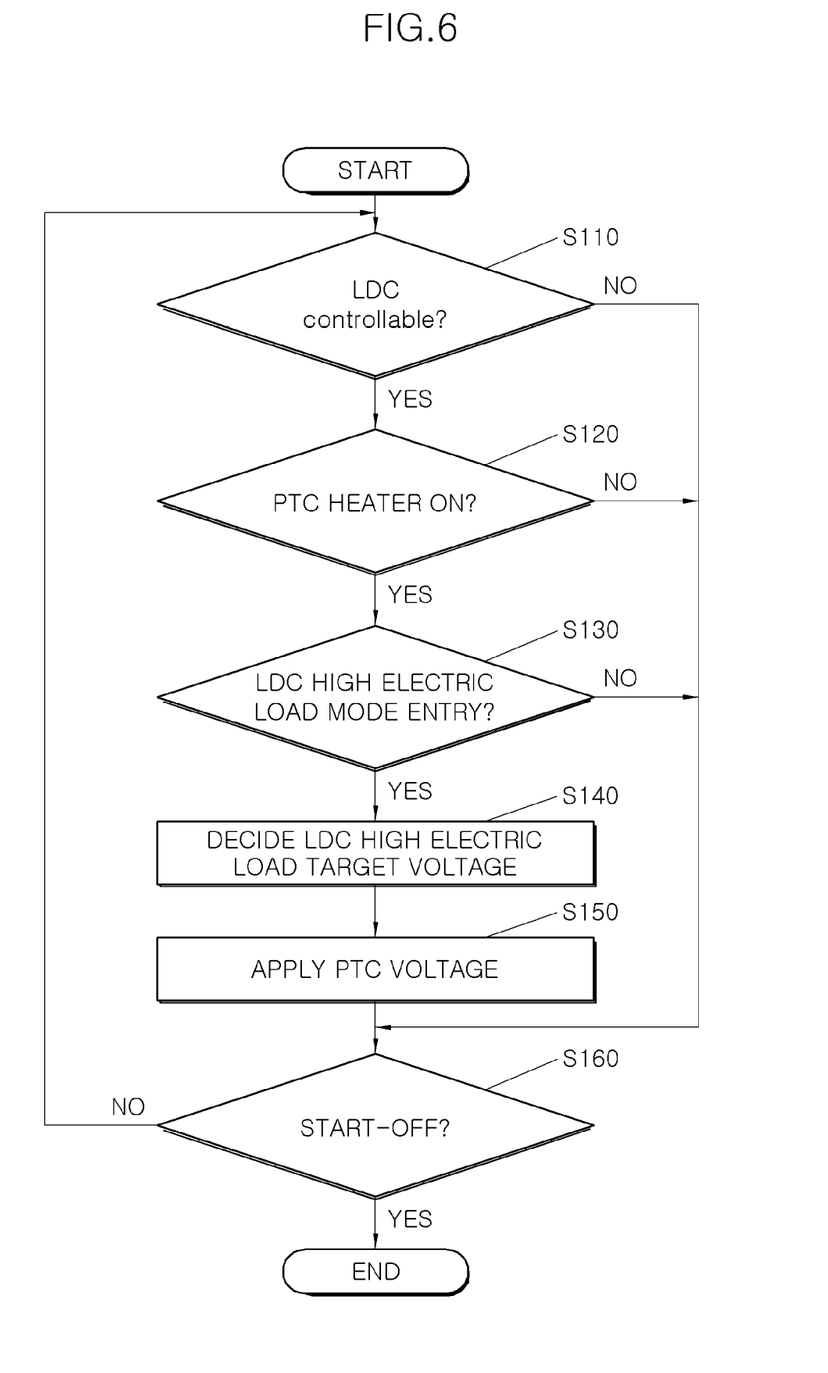
FIG. 6 is a flowchart illustrating a method for controlling heating of a hybrid vehicle according to an exemplary embodiment of the present disclosure.

Hereinafter, a method for controlling heating of a hybrid vehicle according to the present disclosure will be described in detail with reference to the accompanying drawings. The method described herein below may be executed by a controller 50. A method for controlling heating of a hybrid vehicle according to the present disclosure may include determining LDC controllability that determines whether the LDC for converting a power source of a high-voltage battery into a state that may be supplied to the PTC heater 41 operates normally (e.g., without error or malfunction) S110, determining PTC heater operation request that determines whether to operate the PTC heater 41 by not heating the air supplied to an indoor according to a predetermined temperature from a passenger using only the coolant circulated into the heater core 12 S120, determining high electric load mode entry that determines whether the LDC may enter the high electric load mode S130, determining a high electric load target voltage that determines a target output voltage $V_T$ to be output from the LDC to the PTC heater 41 based on a state of an auxiliary battery for supplying power to the engine 11 and an electric component of a vehicle S140, and applying power to a PTC heater that heats the PTC heater 41 by applying the target output voltage $V_T$ to the PTC heater 41 in the LDC to increase temperature of the air passing through the duct 31 S150.

The hybrid vehicle uses the engine 11 and the motor as driving sources, and is used to exert the driving force of only any one of the engine 11 and the motor, or generates power using both the engine 11 and the motor. A conventional internal combustion engine is applied to the engine 11. The motor is driven by a power source charged in a high-voltage battery mounted on the hybrid vehicle, and the high-voltage battery is charged by a hybrid starter generator (HSG) driven by the engine 11, or charged by regenerative braking, etc. from the hybrid vehicle. When the hybrid vehicle is a plug-in hybrid vehicle, the vehicle may be directly charged from a charger. In addition, the hybrid vehicle may be equipped with an auxiliary battery configured to supply power to various controllers within the vehicle, audio, lights, and door locks of the hybrid vehicle, and the auxiliary battery may be charged by the power converted by a low voltage DC-DC converter (LDC) from the high-voltage battery.

In addition, the hybrid vehicle may include the controller 50 configured to perform logic, which will be described later, in the vehicle, and the controller 50 may be configured to operate the engine 11, the PTC heater 41, the compressor 22 of an air conditioner, a fan installed at the duct 31, and the temp door 32.

The determining of the LDC controllability S110 determines whether the LDC operates normally. When the output of the engine 11 is large, the heating amount increases, and thus, a target output voltage $V_T$ output from the LDC decreases. In addition, as the state of charge (SOC) of the auxiliary battery for supplying power to the other electric components of the hybrid vehicle increases, the target output voltage $V_T$ output from the LDC is set to be reduced to reduce the charging amount of the auxiliary battery. Therefore, the determining the LDC controllability S110 determines whether the LDC operates normally.

The determining of the PTC heater operation request S120 determines whether the operation of the PTC heater 41 is required to heat the air flowing into the interior of the hybrid vehicle. When the passenger sets the indoor temperature for heating, the controller 50 may be configured to determine whether to sufficiently increase the temperature of the air flowing through the inside of the duct 31 using only the coolant circulating through the engine 11 and the heater core 12 by being heated by the engine 11. If it is not possible to increase the temperature of the air flowing through the duct 31 using only the coolant flowing into the heater core 12, the controller 50 may be configured to determine that the operation of the PTC heater 41 is requested. The determining of the high electric load mode entry S130 determines whether the LDC may enter the high electric load mode.

Since determining the high electric load target voltage S140 is performed only when all of the determining the LDC controllability S110, the determining the PTC heater operation request S120, and the determining the high electric load mode entry S130 satisfy the conditions, any one of the determining the LDC controllability S110, the determining the PTC heater operation request S120, and the determining the high electric load mode entry S130 may be performed first. However, the determining the LDC controllability S110, the determining the PTC heater operation request S120, and the determining the high electric load mode entry S130 are necessarily performed once.

Meanwhile, when any one of the determining the LDC controllability S110, the determining the PTC heater operation request S120, and the determining the high electric load mode entry S130 does not satisfy the condition, a procedure after the applying power to the PTC heater S150, which will be described later, is performed. The determining of the high electric load target voltage S140 determines the target output voltage $V_T$ to be output from the LDC to the PTC heater 41 based on the state of the engine 11 and the auxiliary battery for supplying power to the electric components of the vehicle.

In response to determining that power is to be applied to the PTC heater 41 according to the above-mentioned conditions, a voltage output from the LDC and applied to the PTC heater 41, that is, the target output voltage $V_T$ of the LDC may be determined. Therefore, the determining of the high electric load target voltage S140 determines the target output voltage $V_T$ of the LDC according to the state of the engine 11 and the auxiliary battery.

Figure 7:
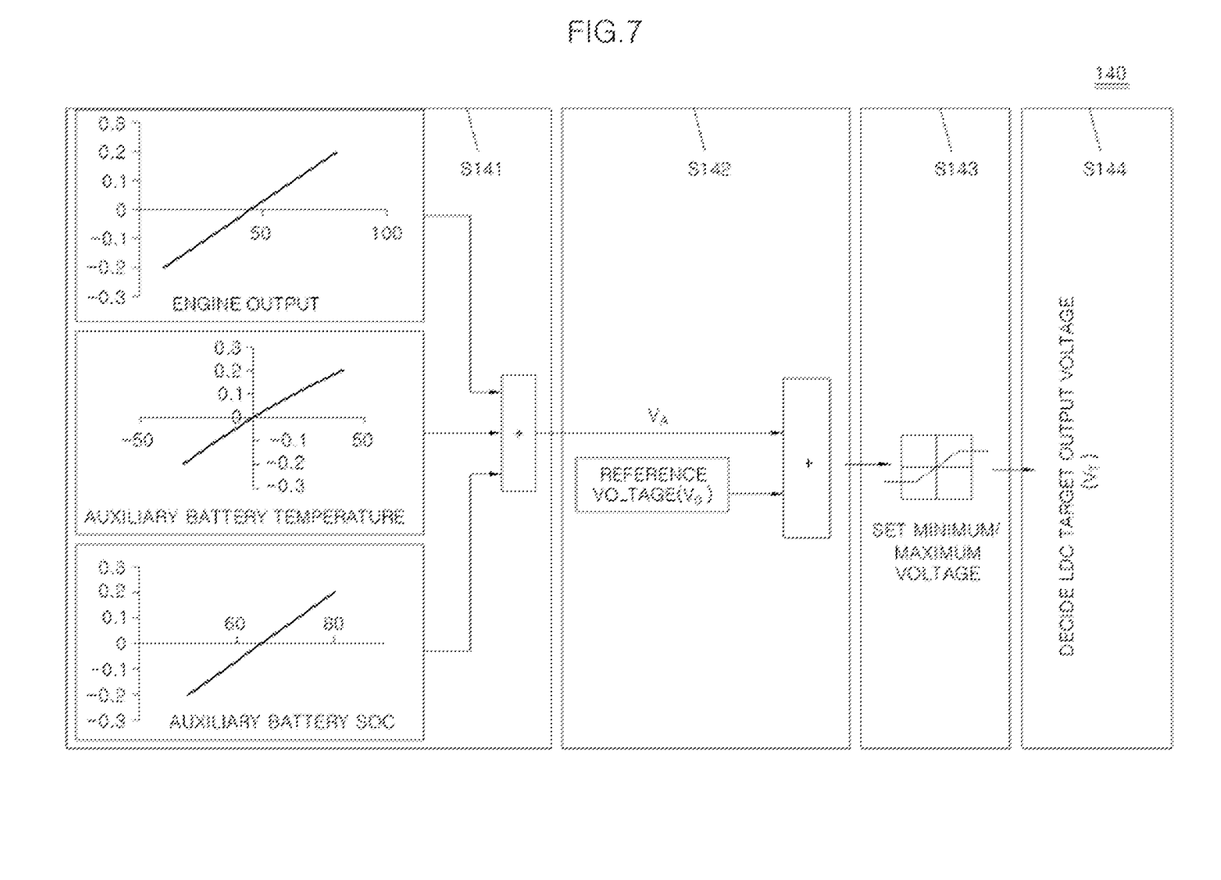
FIG. 7 is a flowchart specifically illustrating determining a high electric load target voltage in the method for controlling heating of the hybrid vehicle according to an exemplary embodiment of the present disclosure.

The determining of the high electric load target voltage S140 may include calculating a correction voltage $V_A$ for correcting a reference voltage $V_0$ based on the state of the engine 11 and the auxiliary battery with respect to the reference voltage V0 S141, calculating the target voltage by adding the correction voltage $V_A$ to the reference voltage $V_0$ S142, and determining the target output voltage by setting the calculated target voltage calculated (from S142) as the target output voltage $V_T$ applied to the PTC heater 41.

The calculating of the correction voltage S141 calculates the correction voltage $V_A$ to be corrected based on the state of the engine 1 and the auxiliary battery with respect to the reference voltage $V_0$, that is, the reference voltage $V_0$ that has been set to be applied to the PTC heater 41 as an initial condition. The correction voltage $V_A$ may be added to the reference voltage $V_0$ to be applied to the PTC heater 41. However, when the correction voltage $V_A$ is negative, a voltage less than the reference voltage may be applied to the PTC heater 41.

The calculating of the correction voltage S141 calculates the correction voltage in direct proportion to the output of the engine 11. The correction voltage $V_A$ may be set to positive (+) when the output of the engine 11 is greater than a predetermined ratio with respect to the maximum output of the engine 11, and the correction voltage $V_A$ may be set to negative (−) when the output of the engine 11 is less than the predetermined ratio. The predetermined ratio may be changed according to a condition of the system.

In addition, the temperature of the auxiliary battery and the correction voltage $V_A$ are directly proportional to each other, and the correction voltage $V_A$ may be set to positive (+) when the temperature of the auxiliary battery is greater than a predetermined temperature, and the correction voltage $V_A$ may be set to negative (−) when the temperature of the auxiliary battery is less than the predetermined temperature. The state of charge (SOC) of the auxiliary battery and the correction voltage $V_A$ are also directly proportional to each other. The correction voltage $V_A$ may be set to positive (+) when the SOC of the auxiliary battery is greater than a predetermined SOC, and the correction voltage $V_A$ may be set to negative (−) when the SOC of the auxiliary battery is less than the predetermined SOC.

Further, the calculating the correction voltage S141 calculates a final correction voltage $V_A$ by summing the correction voltage $V_A$ by the output of the engine, the correction voltage by the temperature of the auxiliary battery, and the correction voltage by the SOC of the auxiliary battery. The calculating of the target voltage S142 calculates the target voltage by adding the correction voltage $V_A$ obtained in the calculating the correction voltage S141 to the reference voltage $V_0$. The target voltage obtained in the calculating the target voltage S142 can be provisionally the target output voltage $V_T$. In other words, the target voltage obtained in the calculating of the target voltage S142 becomes the target output voltage $V_T$ when in a range of the maximum voltage and the minimum voltage in setting a voltage range S143, which will be described later.

The setting of the voltage range S143 confirms whether the calculated target voltage is between the maximum voltage and the minimum voltage capable of being output from the LDC to the PTC heater 41. If the calculated target voltage is greater than the maximum voltage, the target voltage may be reduced to the maximum voltage, and if the calculated target voltage calculated is less than the minimum voltage, the target voltage may be increased to the minimum voltage.

The determining of the target output voltage S144 sets the calculated target voltage as the target output voltage $V_T$ applied to the PTC heater 41. However, the maximum voltage may be set to the target output voltage $V_T$ when the target voltage is greater than the maximum voltage through the above-described setting of the voltage range S143, the minimum voltage may be set to the target output voltage $V_T$ when the target voltage is less than the minimum voltage, and the target voltage may be set to the target output voltage $V_T$ as it is when the target voltage is between the maximum voltage and the minimum voltage.

As described above, the determining of the high electric load target voltage S140 may determine the target output voltage $V_T$ to be output from the LDC to the PTC heater 41 by reflecting the correction voltage $V_A$ based on the state of the engine 11 and the auxiliary battery to optimize the voltage applied to the PTC heater 41, thereby maximally preventing the engine fuel consumption for heating, and enhancing fuel efficiency.

Figure 8:
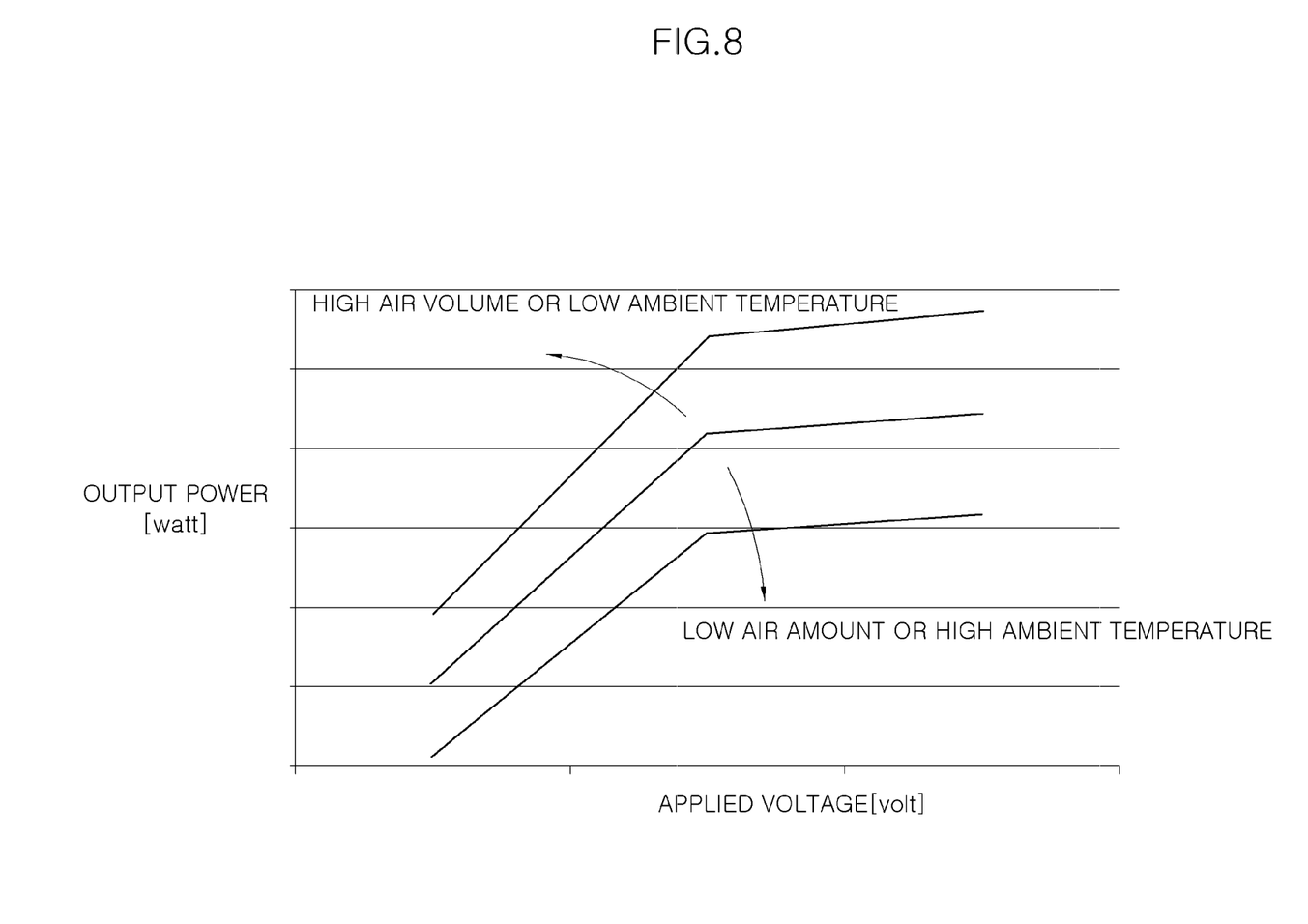
FIG. 8 is a graph illustrating operation characteristics of the PTC heater according to an exemplary embodiment of the present disclosure.

The applying of the power to the PTC heater S150 applies power from the LDC to the PTC heater 41 at the target output voltage $V_T$ to heat the PTC heater 41. The PTC heater 41 has the characteristics as illustrated in FIG. 8. In other words, as the applied voltage increases to a certain level, the output power, that is, the heat generation amount increases, but even if the applied voltage exceeds the certain level, the output power does not substantially increase. In FIG. 8, there is a portion where the heat generation amount increases and a portion where the heat generation amount stagnates based on the broken portion of the middle. In addition, when the air volume is low or the ambient temperature is high, the overall heat generation amount is reduced, and when the air volume is high or the ambient temperature is high, the overall heat generation amount is increased.

Meanwhile, after applying the power to the PTC heater S150, determining start-off S160 may be performed to determine whether the hybrid vehicle has been started. When the hybrid vehicle has been started-off, the logic may be terminated. However, if the hybrid vehicle has not been started-off, the logic may return to the earliest step, for example, determining the LDC controllability S110. When determining the LDC controllability S110 is not performed first, and the determining of the PTC heater operation request S120 or the determining of the high electric load mode entry S130 may be performed first. The determining of the start-off S160 may be performed even when even any one of the determining of the LDC controllability S110, the determining of the PTC heater operation request S120 or the determining of the high electric load mode entry S130 does not satisfy the condition.

Figure 9:
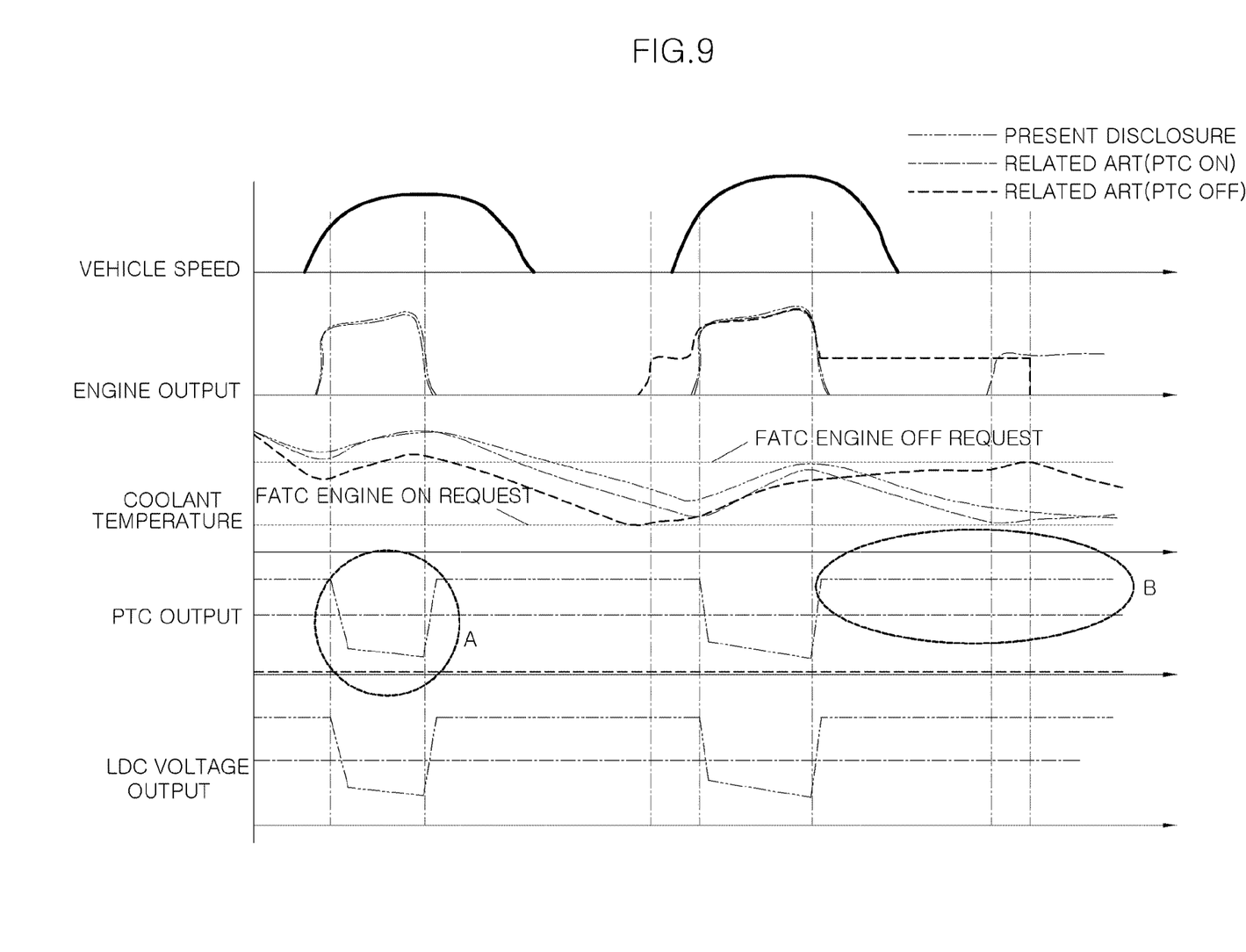
FIG. 9 is a graph illustrating a state of the hybrid vehicle according to the method for controlling heating of the hybrid vehicle according to an exemplary embodiment of the present disclosure.

FIG. 9 is a graph illustrating the state of the hybrid vehicle according to the method for controlling heating of the hybrid vehicle according to the present disclosure. Referring to FIG. 9, even when the PTC heater 41 has been mounted thereon, according to the present disclosure, it may be seen that it is designed to reduce the number of times of operation by the engine 11, thereby enhancing fuel economy.

What is claimed is:

1. A method for controlling heating of a hybrid vehicle having a duct flowing air into the indoor of the hybrid vehicle from the outside, a heater core for circulating the coolant heated from an engine inside the duct, a positive temperature coefficient (PTC) heater heated by the power supplied from a high-voltage battery of the hybrid vehicle inside the duct, and a controller, comprising:

operating, by the controller, the engine and the PTC heater, and heating the air flowing into the indoor of the hybrid vehicle through the duct; and changing, by the controller, the voltage supplied to the PTC heater from a low voltage DC-DC converter (LDC) based on a state of the engine and an auxiliary battery for supplying power to an electric component of the vehicle to apply power to the PTC heater, determining, by the controller, a high electric load target voltage by determining a target output voltage to be output from the LDC to the PTC heater based on the state of the engine and the auxiliary battery for supplying power to the electric component of the vehicle, wherein the determining of the high electric load target voltage includes:

calculating, by the controller, a correction voltage to be corrected based on the state of the engine and the auxiliary battery with respect to a reference voltage that has been set to be applied to the PTC heater as an initial condition;

calculating, by the controller, a target voltage by adding the correction voltage to the reference voltage; and determining, by the controller, the target output voltage by setting the calculated target voltage as a target output voltage applied to the PTC heater, between calculating the target voltage and determining the target output voltage, setting, by the controller, a voltage range that confirms whether the calculated target voltage is between the maximum voltage and the minimum voltage capable of being output from the LDC to the PTC heater;

setting, by the controller, the maximum voltage as the target output voltage when the calculated target voltage is greater than the maximum voltage; and setting, by the controller, the minimum voltage as the target output voltage when the calculated target voltage is less than the minimum voltage.

2. The method for controlling heating of the hybrid vehicle of claim 1, further comprising applying, by the controller, power to the PTC heater by applying the target output voltage to the PTC heater in the LDC to heat the PTC heater to increase a temperature of the air passing through the duct.

3. The method for controlling heating of the hybrid vehicle of claim 1, further comprising:

determining, by the controller, LDC controllability by determining whether the LDC for converting the power of a high-voltage battery into a state capable of being supplied to the PTC heater operates normally, before determining the high electric load target voltage.

4. The method for controlling heating of the hybrid vehicle of claim 3, further comprising:

between determining the LDC controllability and determining the high electric load target voltage, determining, by the controller, PTC heater operation request by determining whether to operate the PTC heater by not heating the air supplied to the indoor based on the temperature that has been set from a passenger using only the coolant circulating into the heater core.

5. The method for controlling heating of the hybrid vehicle of claim 4, further comprising:

between determining the LDC controllability and determining the high electric load target voltage, determining, by the controller, high electric load mode entry by determining whether the LDC is capable of entering a high electric load mode.

6. The method for controlling heating of the hybrid vehicle of claim 5, further comprising;

after applying the power to the PTC heater, determining, by the controller, whether the hybrid vehicle has been turned-off of the hybrid vehicle; and in response to determining that the hybrid vehicle has not been turned-off of the hybrid vehicle, determining the LDC controllability.

7. The method for controlling heating of the hybrid vehicle of claim 6, further comprising:

in response to determining that the LDC does not operate normally, determining that the turn-off of the hybrid vehicle is performed.

8. The method for controlling heating of the hybrid vehicle of claim 6, further comprising in determining the PTC heater operation request:

in response to determining, by the controller, to increase the temperature of the air flowing through the duct so that a passenger reaches a predetermined temperature only with the heat of the heater core, determining the turn-off of the hybrid vehicle.

9. The method for controlling heating of the hybrid vehicle of claim 6, further comprising:

determining, by the controller, the turn-off of the hybrid vehicle in response to determining not to enter the LDC into a high electric load mode.

* * * * *